US009629153B2

(12) United States Patent
HomChaudhuri et al.

(10) Patent No.: US 9,629,153 B2
(45) Date of Patent: Apr. 18, 2017

(54) CONGESTION ADAPTED ACTIVE SCAN DWELL TIME

(71) Applicant: QUALCOMM Incorporated, San Diego, CA (US)

(72) Inventors: Sandip HomChaudhuri, San Jose, CA (US); Pradeep Kumar Yenganti, Sunnyvale, CA (US)

(73) Assignee: QULCOMM Incorporated, San Diego, CA (US)

( * ) Notice: Subject to any disclaimer, the term of this patent is extended or adjusted under 35 U.S.C. 154(b) by 59 days.

(21) Appl. No.: 14/829,228

(22) Filed: Aug. 18, 2015

(65) Prior Publication Data
US 2017/0055254 A1 Feb. 23, 2017

(51) Int. Cl.
*H04W 4/00* (2009.01)
*H04W 72/04* (2009.01)
(Continued)

(52) U.S. Cl.
CPC ....... *H04W 72/0446* (2013.01); *H04W 24/08* (2013.01); *H04W 28/0284* (2013.01); *H04W 48/16* (2013.01)

(58) Field of Classification Search
CPC ... H04L 5/0048; H04L 5/0023; H04L 5/0094; H04L 5/0057; H04L 5/001; H04L 5/0073; H04L 12/189; H04L 12/1881; H04L 1/1861; H04L 25/0202; H04L 47/14; H04L 47/10; H04L 43/0811; H04L 63/101; H04L 41/12; H04L 41/147; H04L 45/70; H04L 5/0055; H04L 47/22; H04L 47/25; H04L 63/1408; H04L 67/1002; H04L 67/101; H04B 7/0626; H04B 7/024; H04B 7/0417; H04B 7/0456; H04B 7/0632; H04B 7/022;
(Continued)

(56) References Cited

U.S. PATENT DOCUMENTS 8,254,332 B2    8/2012  Bertorelle et al.
8,929,328 B2    1/2015  Wu et al.
(Continued)

FOREIGN PATENT DOCUMENTS

WO    WO-2015182986 A1    12/2015

OTHER PUBLICATIONS

Gupta et al., "A Characterization of Wireless NIC Active Scanning Algorithms," IEEE Wireless Communications and Networking Conference (WCNC 2007), Hong Kong, Mar. 2007, pp. 2387-2392, ISBN: 978-1-4244-0658-6, XP031097583, IEEE Operations Center, Piscataway, NJ.
(Continued)

*Primary Examiner* — Nimesh Patel
(74) *Attorney, Agent, or Firm* — Holland & Hart LLP

(57) ABSTRACT

Methods, systems, and apparatuses are described for adaptive dwell time for scan procedures. An access terminal (AT) may identify a scan period associated with performing a scan procedure on a first channel. The AT may analyze a channel congestion metric during the scan period and determine based, at least in part, on the channel congestion metric whether to exit the first channel. The AT may provide a probe request for transmission on a second channel during a remaining portion of the scan period based on the determination to exit the first channel.

30 Claims, 11 Drawing Sheets

(51) Int. Cl.
*H04W 28/02* (2009.01)
*H04W 24/08* (2009.01)
*H04W 48/16* (2009.01)

(58) Field of Classification Search
CPC ...... H04B 17/24; H04B 17/309; H04B 17/31;
H04W 84/12; H04W 48/16; H04W 88/08;
H04W 74/08; H04W 48/08; H04W 88/04;
H04W 72/02; H04W 74/00; H04W 76/04;
H04K 2203/18; H04K 3/42; H04K 3/86
See application file for complete search history.

(56) References Cited

U.S. PATENT DOCUMENTS

| | | | |
|---|---|---|---|
| 8,977,265 B2 | 3/2015 | Lee et al. | |
| 2013/0039181 A1* | 2/2013 | Chao | H04W 48/16 370/235 |
| 2014/0010089 A1 | 1/2014 | Cai et al. | |
| 2015/0334751 A1* | 11/2015 | Alanen | H04W 48/16 370/329 |
| 2015/0351026 A1* | 12/2015 | Lee | H04W 40/244 370/237 |

OTHER PUBLICATIONS

IEEE Computer Society, IEEE Standard for information Technology—Telecommunications and Information Exchange Between Systems—Local and Metropolitan Area Networks—Specific Requirements—Part 11: Wireless LAN Medium Access Control (MAC) and Physical Layer (PHY) Specifications, IEEE Std 802.11™-2007 (Revision of IEEE Std 802.11-1999), Jun. 12, 2007, 1232 pgs, ISBN: 978-0-7381-5656-9, XP068050297, IEEE, New York, NY, USA.

ISA/EP, International Search Report and Written Opinion of the International Searching Authority, Int'l Application No. PCT/US2016/042934, Sep. 22, 2016, European Patent Office, Rijswijk, NL, 14 pgs.

Chintala V.M., et al., "Novel MAC Layer Handoff Schemes for IEEE 802.11 Wireless LANs," IEEE Wireless Communications and Networking Conference (WCNC), 2007, pp. 4438-4443.

* cited by examiner

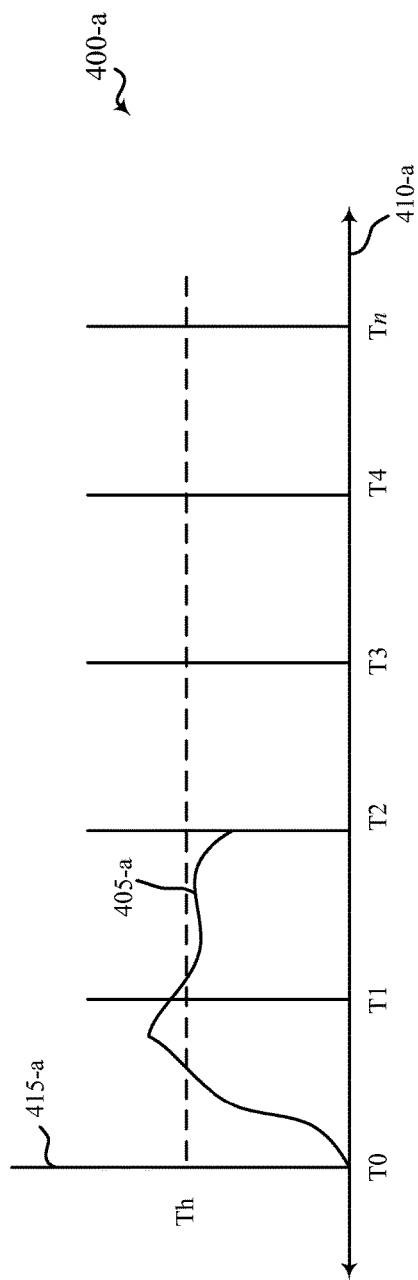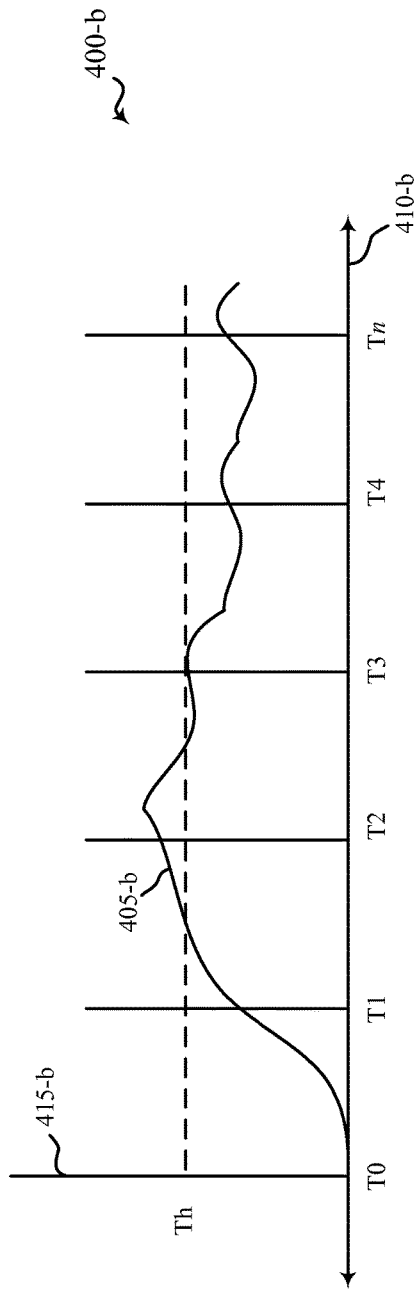

CONGESTION ADAPTED ACTIVE SCAN DWELL TIME

FIELD OF THE DISCLOSURE

The present disclosure relates to wireless communication systems, and more particularly to congestion adapted active scan dwell times.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable an access terminal (AT) to communicate via the network (and/or communicate with other devices coupled to the AP).

ATs typically perform scan procedures on channels of a WLAN, e.g., passive and/or active scans. During passive scans, the AT listens (or monitors) a channel to detect transmissions, e.g., beacons, probe requests/responses, packets, etc. During active scans, the AT actively looks for other devices by broadcasting a probe request and then waiting to see if any devices, e.g., another AT and/or AP, send a probe response. The dwell time is the time the AT waits for a probe response and may result in unnecessarily long total active scan times. For example, when listening for the probe response, the AT typically performs a clear channel assessment (CCA) by detecting energy levels on the channel. If the energy levels rise above a threshold, the AT switches from a minimum dwell time to a maximum dwell time before exiting the current channel and initiating a scan procedure on a different channel. In certain conditions, even the minimum dwell time may be unnecessarily long, e.g., on channels where there are no APs or other devices. Other devices (e.g., Bluetooth, medical devices, etc.) may cause energy levels on the channel to rise above the threshold and trigger the maximum dwell time, thus unnecessarily extending the total active scan time. These unnecessarily long total active scan times may cause increased power use for the AT.

SUMMARY

The present description generally relates to improved systems, methods, apparatuses, or computer-readable media for wireless communications. More particularly, the described features relate to techniques for an adaptive dwell time for channel scanning that provides for a reduced total active scan time and conserves device power. A device, e.g., an access terminal (AT), may evaluate a channel congestion metric during discrete intervals of a scan procedure. Based on the channel congestion metric, the device decides whether to exit the scanning procedure on the current channel (e.g., without waiting a minimum or maximum dwell time) and switch to a scan procedure on a second channel. For example, the AT may broadcast a probe request on the current channel and, at the same time, begin to determine (or accumulate information associated with) the channel congestion metric. The channel congestion metric may provide an indication of whether a probe response is expected. The indication may be based on total wireless local area network (WLAN) congestion, e.g., all detected uplink and downlink Wi-Fi transmissions. The intervals may be measured from the time the probe request is sent and, at a first interval, the device may determine if the channel congestion metric has satisfied a threshold, e.g., at, above, or below a threshold level. If the channel congestion metric satisfies the threshold, this may indicate that no probe response is expected and therefore the AT may exit the scan procedure on the current channel. If the channel congestion metric does not satisfy the threshold, this may indicate that a probe response may be expected. As a result, the AT may continue the scan procedure on the current channel, e.g., continue determining the channel congestion metric during a second interval.

Aspects of the present disclosure provide an apparatus for wireless communication. The apparatus may include a processing system configured to identify a scan period associated with performing a scan procedure on a first channel, analyze a channel congestion metric during the scan period, determine based, at least in part, on the channel congestion metric whether to exit the first channel, and a first interface configured to provide a probe request for transmission on a second channel during a remaining portion of the scan period based on the determination to exit the first channel.

In some aspects, the processing system may be further configured to analyze the channel congestion metric over a plurality of intervals of the scan period, and determine whether to exit the first channel based on a function of the channel congestion metric over the plurality of intervals of the scan period. The function of the channel congestion metric may include a different threshold level of the channel congestion metric for each interval of the plurality of intervals. The processing system may be further configured to identify a trend associated with the channel congestion metric over at least some of a plurality of intervals of the scan period, wherein the determination whether to exit the first channel is further based on the trend associated with the channel congestion metric.

In some aspects, the processing system may be further configured to determine whether a probe response is received during a first interval of a plurality of intervals of the scan period, wherein the processing system is further configured to transition to a second interval of the plurality of intervals of the scan period based at least in part on reception of the probe response. The processing system may be further configured to exit the first channel based on the channel congestion metric satisfying a threshold level for a plurality of intervals of the scan period.

In some aspects, the processing system may be further configured to divide the scan period into a plurality of intervals, identify at least one threshold level that is associated with each interval of the plurality of intervals, analyze the channel congestion metric during each interval of the plurality of intervals, and compare the channel congestion metric during each interval with the associated threshold level, wherein the determination whether to exit the first channel is further based on the comparison. The first interface may be further configured to initiate the scan procedure by outputting an initial probe request for transmission. The channel congestion metric may be based in part on a probability associated with receiving a probe response responsive to the transmission of the probe request.

In some aspects, the channel congestion metric is based on at least one of a Wi-Fi communication associated with the apparatus, a one or more Wi-Fi communications within a basic subscriber set (BSS) associated with the apparatus, or a Wi-Fi communication for a BSS not associated with the apparatus.

Aspects of the present disclosure provide a method for wireless communication. The method may include identifying a scan period associated with performing a scan procedure on a first channel, analyzing a channel congestion metric during the scan period, determining based, at least in part, on the channel congestion metric whether to exit the first channel, and providing a probe request for transmission on a second channel during a remaining portion of the scan period based on the determination to exit the first channel.

In some aspects, the method may include analyzing the channel congestion metric over a plurality of intervals of the scan period, and determining whether to exit the first channel based on a function of the channel congestion metric over the plurality of intervals of the scan period. The function of the channel congestion metric may include a different threshold level of the channel congestion metric for each interval of the plurality of intervals. The method may include identifying a trend associated with the channel congestion metric over at least some of a plurality of intervals of the scan period, wherein the determination whether to exit the first channel is further based on the trend associated with the channel congestion metric.

In some aspects, the method may include determining whether a probe response is received during a first interval of a plurality of intervals of the scan period, and transitioning to a second interval of the plurality of intervals of the scan period based at least in part on reception of the probe response. The method may include exiting the first channel based on the channel congestion metric satisfying a threshold level for a plurality of intervals of the scan period.

In some aspects, the method may include dividing the scan period into a plurality of intervals, identifying at least one threshold level that is associated with each interval of the plurality of intervals, analyzing the channel congestion metric during each interval of the plurality of intervals, and comparing the channel congestion metric during each interval with the associated threshold level, wherein the determination whether to exit the first channel is further based on the comparison. The method may include initiating the scan procedure by outputting an initial probe request for transmission.

In some aspects, the channel congestion metric may be based in part on a probability associated with receiving a probe response responsive to the transmission of the probe request. The channel congestion metric may be based on at least one of a Wi-Fi communication associated with the apparatus, one or more Wi-Fi communications within a basic subscriber set (BSS) associated with the apparatus, or a Wi-Fi communication for a BSS not associated with the apparatus.

Aspects of the present disclosure provide an apparatus for wireless communication. The apparatus may include means for identifying a scan period associated with performing a scan procedure on a first channel, means for analyzing a channel congestion metric during the scan period, means for determining based, at least in part, on the channel congestion metric whether to exit the first channel, and means for providing a probe request for transmission on a second channel during a remaining portion of the scan period based on the determination to exit the first channel.

In some aspects, the apparatus may include means for analyzing the channel congestion metric over a plurality of intervals of the scan period, and means for determining whether to exit the first channel based on a function of the channel congestion metric over the plurality of intervals of the scan period. The function of the channel congestion metric may include a different threshold level of the channel congestion metric for each interval of the plurality of intervals. The apparatus may include means for identifying a trend associated with the channel congestion metric over at least some of a plurality of intervals of the scan period, wherein the determination whether to exit the first channel is further based on the trend associated with the channel congestion metric.

In some aspects, the apparatus may include means for determining whether a probe response is received during a first interval of a plurality of intervals of the scan period, and means for transitioning to a second interval of the plurality of intervals of the scan period based at least in part on reception of the probe response. The apparatus may include means for exiting the first channel based on the channel congestion metric satisfying a threshold level for a plurality of intervals of the scan period.

In some aspects, the apparatus may include means for dividing the scan period into a plurality of intervals, means for identifying at least one threshold level that is associated with each interval of the plurality of intervals, means for analyzing the channel congestion metric during each interval of the plurality of intervals, and means for comparing the channel congestion metric during each interval with the associated threshold level, wherein the determination whether to exit the first channel is further based on the comparison.

In some aspects, the apparatus may include means for initiating the scan procedure by outputting an initial probe request for transmission. The channel congestion metric may be based in part on a probability associated with receiving a probe response responsive to the transmission of the probe request. The channel congestion metric may be based on at least one of a Wi-Fi communication associated with the apparatus, one or more Wi-Fi communications within a basic subscriber set (BSS) associated with the apparatus, or a Wi-Fi communication for a BSS not associated with the apparatus.

Aspects of the present disclosure provide a computer-readable medium storing computer-executable code for wireless communication. The code executable by a processor to identify a scan period associated with performing a scan procedure on a first channel, analyze a channel congestion metric during the scan period, determine based, at least in part, on the channel congestion metric whether to exit the first channel, and provide a probe request for transmission on a second channel during a remaining portion of the scan period based on the determination to exit the first channel.

Aspects of the present disclosure provide an access terminal for wireless communication. The access terminal may include a processing system configured to identify a scan period associated with performing a scan procedure on a first channel, analyze a channel congestion metric during the scan period, determine based, at least in part, on the channel congestion metric whether to exit the first channel, and a transmitter configured to transmit a probe request for transmission on a second channel during a remaining portion of the scan period based on the determination to exit the first channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 4A and 4B show example timing chart diagrams for congestion adapted active scan dwell time, in accordance with various aspects of the present disclosure;

DETAILED DESCRIPTION

Figure 1:
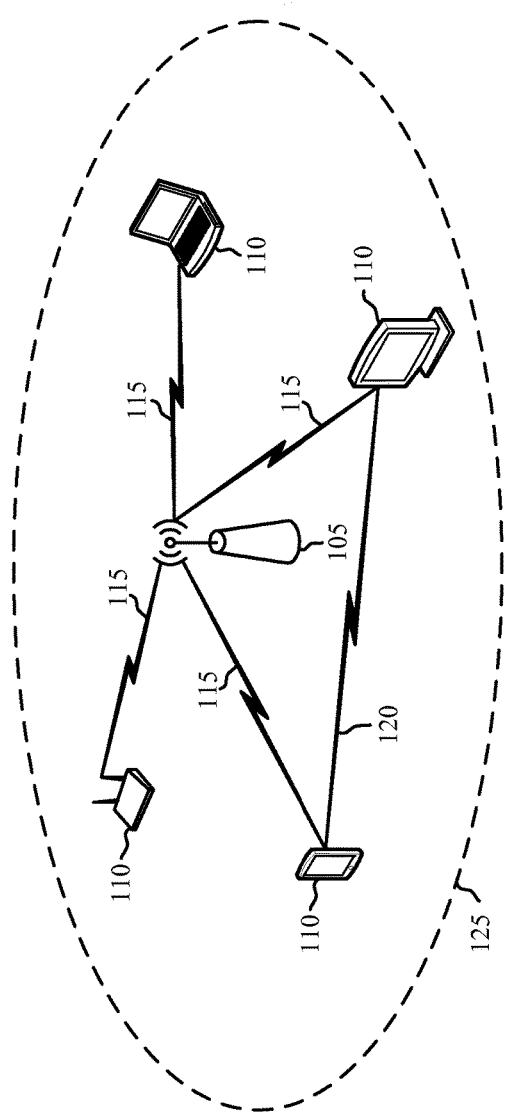
FIG. 1 shows a block diagram of a wireless communication system, in accordance with various aspects of the present disclosure.

The described features generally relate to improved systems, methods, and/or apparatuses for adapting and reducing the active scan dwell time based on a congestion metric of the channel of a wireless network, such as a wireless local area network (WLAN) or Wi-Fi network. Conventional active scan techniques provide for an access terminal (AT) to send (broadcast) a probe request frame on a channel and then wait for a probe response from neighboring devices (e.g., other ATs, access points (APs), etc.) for what is commonly referred to as a dwell time. The waiting during the dwell time, however, generally provides for extended scan time delays and unnecessary power consumption by the AT. For example, the AT generally waits a minimum dwell time (MinChannelTime) for a clear channel assessment (CCA) to be asserted busy before exiting the channel (e.g., moving on to a scan procedure on a new channel). When the CCA is asserted busy, the AT may also wait a maximum dwell time (MaxChannelTime) for the probe response. Other devices may cause interference which causes the CCA to conclude the channel as being busy. As a result, the AT may unnecessarily wait the maximum time. Some conventional techniques rely on a set time (e.g., between the minimum time and the maximum time) for the dwell time, but this approach may still result in the AT waiting longer than necessary, e.g., in the situation where no probe response is likely to be received.

The described techniques provide for the AT to determine a channel congestion metric associated with a scanned channel and adapt the dwell time based on the channel congestion metric. The channel congestion metric may provide an indication of whether a probe response can be expected. For example, a high channel congestion metric may indicate that the channel is congested, which may indicate that devices (e.g., APs) are likely present on the channel. As a result, these devices may need additional time to capture the channel to send a probe response to the AT. Conversely, a low channel congestion metric may indicate that there is little or no Wi-Fi activity on the channel and therefore a probe response is not likely. The AT may determine the channel congestion metric (e.g., a probability metric) for the probe response arrival in a given time and evaluate the channel congestion metric at discrete (configurable) intervals. The channel congestion metric may be determined (or computed) continuously during a scan period and evaluated at each interval. If the channel congestion metric satisfies a threshold, e.g., is above a threshold level, the scan procedure may proceed into the next discrete interval. If the channel congestion metric is below the threshold, the scan procedure on the current channel may abort (e.g., the AT may exit the channel) and the AT may initiate the scan procedure on a next channel. In other examples, when the channel congestion metric is above the threshold, the scan procedure may continue into the next interval to establish a trend associated with the channel congestion metric over a configurable number of intervals.

According to other aspects, secondary (or optional) features may be implemented for adaptation of the dwell time based on the channel congestion metric. Additional probe requests may be sent at configurable discrete intervals, e.g., every other interval, every third interval, etc. The channel congestion metric may be smoothed (or averaged) across a number of intervals using an M-stage IIR filter, for example. The scan procedure may be advanced or incremented to the next interval even in the situation where a probe response is received and the channel congestion metric is below the threshold. The channel scan procedure may automatically proceed to a maximum dwell time after a configurable number of intervals.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing at least one of the Institute of Electrical and Electronics Engineers (IEEE) 802.11 family of standards. The WLAN network 100 may include an AP 105 and one or more wireless devices or ATs 110, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may have multiple APs 105. Each of the ATs 110, which may also be referred to as mobile stations (MSs), mobile devices, wireless stations, user equipment (UE), subscriber stations (SSs), or subscriber units, may associate and communicate with an AP 105 via a communication link 115. Each AP 105 has a geographic coverage area 125 such that ATs 110 within that area can typically communicate with the AP 105. The ATs 110 may be dispersed throughout the geographic coverage area 125. Each AT 110 may be stationary or mobile.

An AT 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an AP 105 may be divided into sectors making up only a portion of the coverage area. The WLAN network 100 may include APs 105 of different types (e.g., metropolitan area, home network, etc.), with varying sizes of coverage areas and overlapping coverage areas for different technologies. Other wireless devices can communicate with the AP 105.

While the ATs 110 may communicate with each other through the AP 105 using communication links 115, each AT 110 may also communicate directly with one or more other ATs 110 via a direct wireless link 120. Two or more ATs 110 may communicate via a direct wireless link 120 when both ATs 110 are in the AP geographic coverage area 125 or when one or neither AT 110 is within the AP geographic coverage area 125. Examples of direct wireless links 120 may include Wi-Fi Direct connections, connections established by using a Wi-Fi Tunneled Direct Link Setup (TDLS) link, and other peer-to-peer (P2P) group connections. The ATs 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other P2P connections and/or ad hoc networks may be implemented within the WLAN network 100.

In certain aspects, ATs 110 may be configured for an adaptive dwell time for channel scanning that provides for a reduced total active scan time and conserves AT 110 power. The active scan procedure generally includes the AT 110 sending a probe request frame on a channel, waiting for a probe response frame from AP 105, as well as other neighboring APs 105. Generally, AT 110 may evaluate a channel congestion metric during discrete intervals of a scan procedure and, based on the channel congestion metric, decide whether to exit the scanning procedure on the current channel (e.g., without waiting a minimum dwell time or a maximum dwell time), and switch to a scan procedure on a second channel. For example, the AT 110 may broadcast a probe request on the channel and, at the same time, begin to determine (or accumulate information associated with) the channel congestion metric. The channel congestion metric may provide an indication of whether a probe response is expected on the channel. In some aspects, the channel congestion metric may be determined based on total congestion of the WLAN network 100, e.g., all detected uplink and downlink Wi-Fi transmissions.

In some examples, the scanning process may be divided into a plurality of intervals. The intervals may be measured from the time the probe request is sent. At a first interval, the AT 110 may determine if the channel congestion metric satisfies a threshold, e.g., is above, at, or below a threshold level. If the channel congestion metric is below the threshold, this may indicate that no probe response is expected. As a result, the AT 110 may exit the scan procedure on the current channel. If the channel congestion metric is above the threshold, however, this may indicate that a probe response may be expected on the current channel. The AT 110 may continue the scan procedure on the current channel, e.g., allow neighboring APs more time to send the probe response during a second interval. At the end of the second interval, the AT 110 may determine if the channel congestion metric is above, at, or below a threshold and continue or exit the scan procedure on the current channel accordingly.

In some aspects, the channel congestion metric may be determined based on one or more counters that are initialized when the AT 110 transmits the probe request. The counters may be incremented based on detection of AT 110 Wi-Fi reception(s), AT 110 Wi-Fi transmission(s), all Wi-Fi uplink transmissions within the device basic subscriber set (BSS), all Wi-Fi downlink transmissions within the device BSS, all BSS Wi-Fi traffic transmissions, all other BSS Wi-Fi traffic transmissions, or combinations thereof. Accordingly, false CCA triggers caused by other devices communicating in or near the channel frequency, e.g., Bluetooth, medical devices, ZigBee, etc., may be avoided.

In one example, evaluation of the channel congestion metric may include additional considerations or actions. For example, additional probe requests may be transmitted at one or more discrete intervals based on the channel congestion metric. As another example, evaluation of the channel congestion metric may be performed across multiple intervals to establish a trend, e.g., an average, a rising trend, a falling trend, etc., for the channel congestion metric. Evaluation of the channel congestion metric may be stopped, in some examples, after a certain number of intervals and the AT may wait the maximum dwell time for scan procedure on the channel. Thus, ATs 110 may adapt the dwell time for active channel scanning procedures based on the indication of whether a probe response is expected, and ATs 110 can avoid extended dwell times on channels where no Wi-Fi transmissions are present, for example. This may reduce the total active scan time and conserve AT 110 power.

Figure 2:
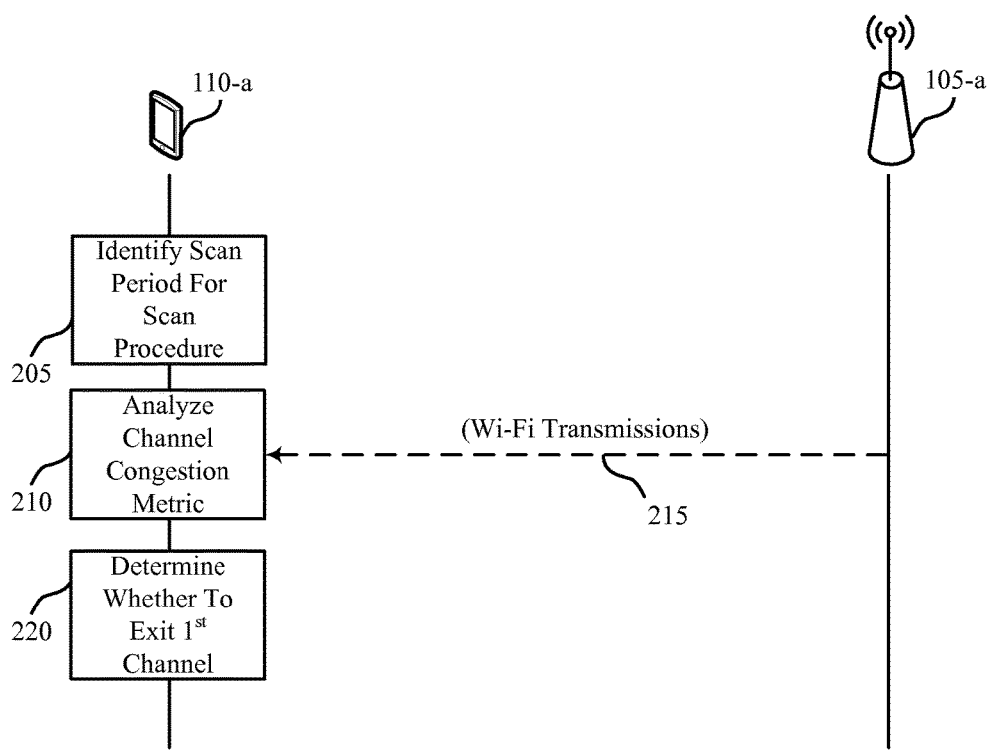
FIG. 2 shows an example diagram of aspects of communications using congestion adapted active scan dwell time for use in wireless communication, in accordance with various aspects of the present disclosure.

FIG. 2 shows an example diagram 200 of aspects of communications using congestion adapted active scan dwell time for use in wireless communication, in accordance with various aspects of the present disclosure. Diagram 200 illustrates communications between an AT 110-a and an AP 105-a. AT 110-a may be an example of one or more aspects of an AT 110 described with reference to FIG. 1. AP 105-a may be an example of one or more aspects of an AP 105 described with reference to FIG. 1. In some examples, AT 110-a may include an processing system and an interface configured to perform the described functions.

At 205, AT 110-a may identify a scan period for a scan procedure on a channel (e.g., a first channel) of a wireless communication system, such as WLAN network 100 described with reference to FIG. 1. For example, the AT 110-a may divide the scan period into discrete intervals or time slots. The first interval may begin with a transmission of a probe request. As one non-limiting example, a scan period may range between 20-80 milliseconds (ms) per channel and may be divided into 2, 3, 4, 5, or some other number of discrete intervals during the scan period. Accordingly, the intervals may provide for a quicker and/or more opportunities to determine the feasibility of continuing the scan procedure on the current channel.

At 210, the AT 110-a may analyze a channel congestion metric during the scan period. The channel congestion metric may be based, for example, on Wi-Fi transmissions 215 received from AP 105-a, as well as transmissions from other APs. Generally, the channel congestion metric may provide an indication of the likelihood of receiving a probe response that is responsive to the probe request. The AT 110-a may collect information or data (e.g., initiate one or more counters) associated with the channel congestion metric upon sending the probe request and during the discrete intervals of the scan period. In some aspects, a higher channel congestion metric may indicate that access to the channel (e.g., via a carrier sense channel access scheme) may be delayed and, consequently, that any probe response may also be delayed and that the AT 110-a should wait longer.

The channel congestion metric may provide a representation of the Wi-Fi traffic on the channel that is more reliable than the raw signal strength measurements associated with the traditional CCA procedures. For example, the channel congestion metric may include a measurement, or count, of the total Wi-Fi congestion on the channel, e.g., all Wi-Fi traffic to/from the AT 110-a as well as all other uplink and downlink Wi-Fi traffic observed, or monitored, by the AT 110-a. In another example, the channel congestion metric may include a measurement, or count, of all uplink Wi-Fi traffic observed, or monitored, by the AT 110-a. In another example, the channel congestion metric may include a measurement, or count, of all downlink traffic observed, or monitored, by the AT 110-a. In another example, the channel congestion metric may include a measurement, or count, of all Wi-Fi traffic measured, or observed, by the AT 110-a that is associated with the BSS of the AT 110-a. In yet another example, the channel congestion metric may include a measurement, or count, of all Wi-Fi traffic measured, or observed, by the AT 110-a from BSS(s) other than the BSS of the AT 110-a. In some example, the channel congestion metric may include one or more aspects of some or all the above-described measured, or observed, Wi-Fi traffic by the AT 110-a. The AT 110-a may decode one or more monitored frames to distinguish between a Wi-Fi signal and some other signal present in the channel (e.g., a Bluetooth signal, a microwave signal, a medical device signal, and the like).

Aspects of the channel congestion metric may be determined (or computed) based on reception of wideband Wi-Fi traffic. For example, the AT 110-a may perform a scan procedure on the channel and detect Wi-Fi traffic. The AT 110-a may determine that at least some of the detected Wi-Fi traffic is wideband traffic (e.g., by decoding portions of a Wi-Fi preamble of the Wi-Fi traffic). The wideband traffic generally includes traffic transmitted across the current channel and a number of other channels, depending on the bandwidth, e.g., 40 MHz, 80 MHz, 160 MHz, etc. Based on detecting and identifying the channels used for the wideband Wi-Fi traffic, the AT 110-a may determine the channel congestion metric for the current channel and for the other channels used for the wideband traffic. In some examples where the AT 110-a detects wideband Wi-Fi traffic, the AT 110-a may perform parallel scan procedures on the channels used for the wideband traffic.

At 220, the AT 110-a may determine whether to exit the scan procedure on the first channel based on the channel congestion metric. For example, the AT 110-a may compare the channel congestion metric to a threshold value to determine whether to exit the scan procedure on the first channel. If the channel congestion metric satisfies the threshold, e.g., is below the threshold, the AT 110-a may exit the scan procedure on the first channel and, assuming there are additional channel(s) to be scanned, initiate a scan procedure on a second channel by sending a probe request on the second channel. If the channel congestion metric does not satisfy the threshold, the AT 110-a may continue the scan procedure on the first channel and transition or advance to the next interval. The AT 110-a may continue to determine the channel congestion metric (e.g., continue to collect data associated with congestion on the channel) during the next interval. At the end of the next (or second) interval, the AT 110-a may compare the channel congestion metric to the threshold (the same threshold as used at the conclusion of the first interval or a different threshold) to determine whether to exit the scan procedure on the first channel.

The AT 110-a may determine that the channel congestion metric has satisfied the threshold for more than one interval before determining whether to exit the scan procedure on the first channel. For example, the AT 110-a may analyze the channel congestion metric over a predefined number of intervals to identify, or determine, a trend associated with the channel congestion metric. Analyzing the channel congestion metric over multiple intervals may provide an increased confidence level with respect to the expectancy of a probe response being received.

Some aspects may include the AT 110-a sending additional probe requests at one or more of the intervals of the scan period. The AT 110-a may smooth the channel congestion metric across multiple intervals using an infinite impulse response (IIR) filter, for example. The AT 110-a may receive a probe response during one interval and auto-advance to the next interval. The AT 110-*a* may identify a number of intervals after which the scan procedure will automatically wait the maximum dwell time before exiting the scan procedure on the first channel.

The AT 110-*a* may have multiple thresholds for different intervals. As one example, the AT 110-*a* may maintain a lookup table associating threshold level(s) with different intervals (e.g., different threshold levels based on the time since the probe request was sent). For each interval, the AT 110-*a* may compare the channel congestion metric to the threshold associated with the interval. After a given number of intervals (and associated channel congestion metric comparisons), the AT 110-*a* may determine whether the dwell time may be stopped and exit the scan procedure on the first channel and send a probe request on a second channel to initiate a new scan procedure.

Figure 3:
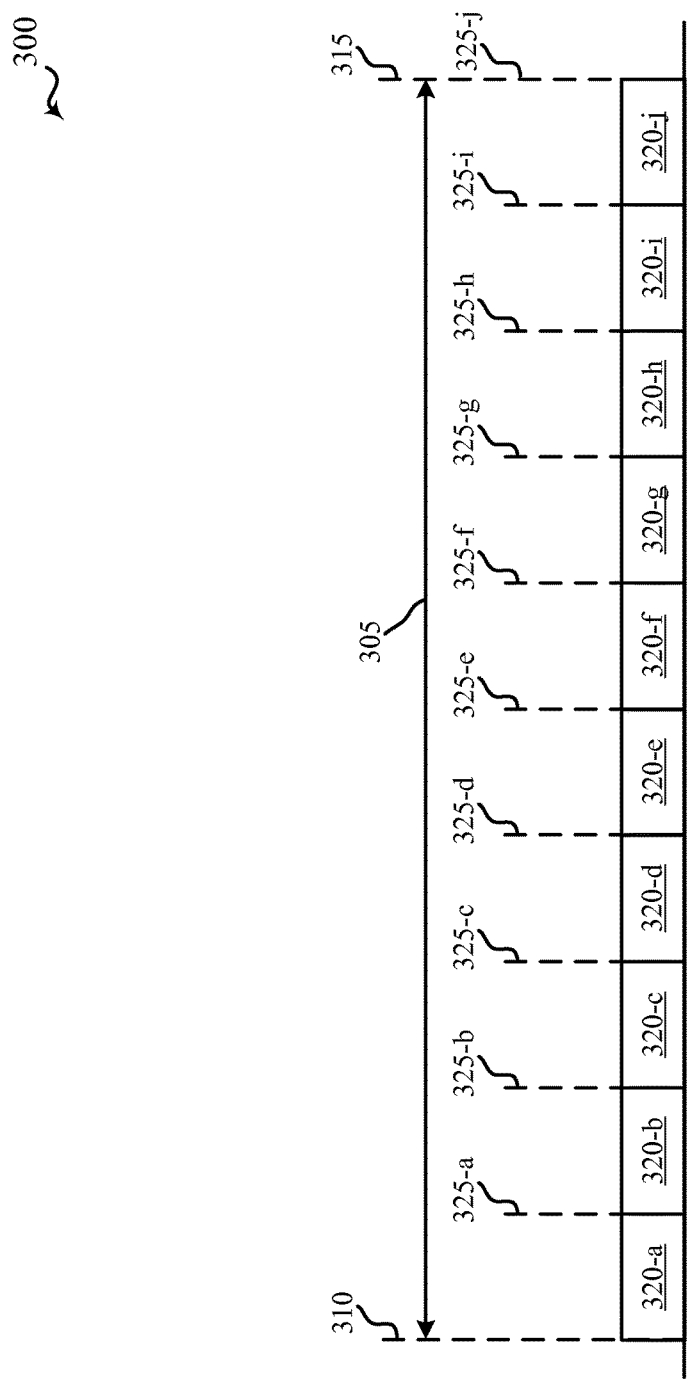
FIG. 3 shows an example timing diagram for congestion adapted active scan dwell time, in accordance with various aspects of the present disclosure.

FIG. 3 shows a timing diagram 300 illustrating various timing aspects of the present disclosure. The timing diagram 300 may be implemented by one or more aspects of the ATs 110 describes with reference to FIGS. 1 and/or 2.

The timing diagram 300 illustrates a sample scan period 305 defined as the time between start time 310 and end time 315. Start time 310 may correspond to the time when a probe request is transmitted on the channel on which a scan procedure is performed. The sample scan period 305 may be divided into a plurality of intervals 320. Although 10 intervals 320 are shown in timing diagram 300, it is to be understood that the sample scan period 305 may be divided into fewer intervals 320 or more intervals 320.

An AT 110 may send a probe request at start time 310 on a channel (e.g., a first channel). The probe request may include an indication to APs receiving the probe request to respond by sending a probe response. The AT 110 may determine the presence of the responding APs based on the received probe responses. AT 110 may begin to measure the channel congestion metric on the channel at start time 310, i.e., once the probe request is sent, the AT 110 may begin to accumulate data associated with the channel congestion metric. For example, the AT 110 may initiate counter(s) that measure and record the amount of Wi-Fi transmissions measured, or observed, by AT 110, as described above.

After each interval 320, at time 325, the AT 110 may evaluate the dwell time and determine whether to continue the scan procedure on the channel or exit the channel and initiate a scan procedure on a second channel. For example, the AT 110 may accumulate the channel congestion metric information during interval 320-*a* and determine whether to exit the channel at time 325-*a*. AT 110 may compare the measured channel congestion metric with a threshold to determine whether to exit the channel or continue the scan procedure into the next interval, e.g., interval 320-*b*, and evaluate the channel congestion metric again at the conclusion of interval 320-*b*, at time 325-*b*.

AT 110 may transition to the next interval 320 when the channel congestion metric indicates that the AT 110 received a Wi-Fi transmission during the interval 320. The AT 110 may determine whether to exit the channel by smoothing the channel congestion metric across multiple intervals 320, e.g., by averaging the channel congestion metric across the multiple intervals or by applying a filter to the channel congestion metric. The AT 110 may send additional probe requests at different intervals 320, e.g., send a probe request at every time 325, at every other time 325, at every third time 325, and the like. The AT 110 may send an additional probe request after one interval. The additional probe request may increase the chance of receiving a probe response.

The AT 110 may decide whether to exit the scan procedure on the first channel based on the comparison of the channel congestion metric with a threshold at time 325. If the channel congestion metric is at or below the threshold, this may indicate that the channel is not congested and that any neighboring APs would have likely had time to respond with a probe response. This may indicate that the dwell time may be shortened and that the AT 110 may exit the first channel and initiate a scan procedure on a second channel by sending a probe request on the second channel. Conversely, if the channel congestion metric is above the threshold, this may indicate that the first channel is congested. Therefore, any neighboring APs may not have had an opportunity to capture the first channel to send a probe response. The dwell time may be extended, the AT 110 may transition to the next interval 320, and the AT 110 may continue to monitor the channel congestion metric.

The AT 110 may implement the described functions to adapt the dwell time dependent upon the channel congestion metric to allow, when congested, more time for neighboring APs to capture the channel to send probe responses. Conversely, the AT 110 may exit the scan procedure on the channel when the channel congestion metric indicates that there is little or no Wi-Fi traffic on the channel and, therefore, no probe response is likely.

FIGS. 4A and 4B illustrate example timing chart diagrams 400 for congestion adapted active scan dwell time, in accordance with various aspects of the present disclosure. The timing chart diagrams 400 may be implemented by one or more aspects of the ATs 110 described with reference to FIGS. 1-3.

Referring first to FIG. 4A, diagram 400-*a* is a chart that shows one example of a channel congestion metric 405-*a* plotted along a time axis 410-*a* and a threshold value axis 415-*a*. At time T0, an AT 110 may transmit a probe request on a channel (e.g., a first channel) to initiate a scan procedure on the channel. The AT 110 may begin to accumulate the channel congestion metric 405-*a* at time T0, by initiating one or more counters at time T0. For example, the AT may have a counter associated with Wi-Fi downlink transmissions of the AT 110, with Wi-Fi uplink transmissions of the AT 110, with all Wi-Fi transmissions occurring on the BSS of the AT 110, with all Wi-Fi transmissions occurring on BSSs other than the AT 110 BSS, etc. The channel congestion metric 405-*a* may be a function of the counter(s), e.g., a total value, an time-weighted average value, a rate of change of the channel congestion metric 405-*a*, etc.

At time T1, the AT 110 may evaluate the channel congestion metric 405-*a* to determine whether to continue the scan procedure on the channel or to exit the channel and end the scan procedure. The AT 110 may evaluate the channel congestion metric 405-*a* by comparing it to a threshold level (Th) to determine whether the channel congestion metric satisfies the threshold. In the example diagram 400-*a*, at time T1 the channel congestion metric 405-*a* is above the threshold level. This may indicate that the channel is congested with Wi-Fi traffic, and that neighboring APs may experience difficulty capturing the channel to send a probe response. As a result, the AT 110 may transition to the next interval and continue the scan procedure. During the interval between time T1 and T2, the channel congestion metric may drop below the threshold level. At time T2, the AT 110 may again compare the channel congestion metric to the threshold level. In the example diagram 400-*a*, the AT 110 may exit the channel at time T2 based on the channel congestion metric satisfying the threshold, e.g., being below the threshold, and therefore end the scan procedure on the channel. As shown in diagram 400-a, the AT 110 may avoid unnecessary delay time performing the scan procedure on the channel based on the channel congestion metric and, therefore, reduce the total active scan time.

Referring next to FIG. 4B, diagram 400-b is a chart that shows one example of a channel congestion metric 405-b plotted along a time axis 410-b and a threshold value axis 415-b. At time T0, an AT 110 may transmit a probe request on a channel (e.g., a first channel) to initiate a scan procedure on the channel. The AT 110 may begin to accumulate the channel congestion metric 405-b at time T0. For example, one or more counters may be initiated at time T0 to begin the accumulation of the channel congestion metric 405-b. The channel congestion metric 405-b may be a function of the counter(s), e.g., a total value, an time-weighted average value, etc.

At time T1, the AT 110 may compare the channel congestion metric 405-b to the threshold value (Th) to determine whether to exit the scan procedure on the channel. As shown in diagram 400-b, the channel congestion metric 405-b is below the threshold value. In some aspects, the AT 110 may continue the scan procedure for multiple intervals before making the decision whether to exit the current channel, e.g., the AT 110 may identify a trend associated with the channel congestion metric 405-b. In the example diagram 400-b, at time T2, the channel congestion metric 405-b is above the threshold level. At times T3-Tn, wherein n is a positive integer and may be configurable, the channel congestion metric 405-b is below the threshold level. Accordingly, the AT 110 may determine that the channel congestion metric 405-b is below the threshold level for a number of intervals and determine to exit the scan procedure on the current channel. The AT 110 may determine that the channel congestion metric 405-b is on a downward trend and determine to exit the scan procedure on the current channel.

Thus, diagrams 400-a and 400-b illustrate examples of an AT 110 evaluating a channel congestion metric, or a function thereof, to determine whether to exit the scan procedure on the current channel and send a probe request on a second channel to start a new scan procedure on the second channel.

Figure 5:
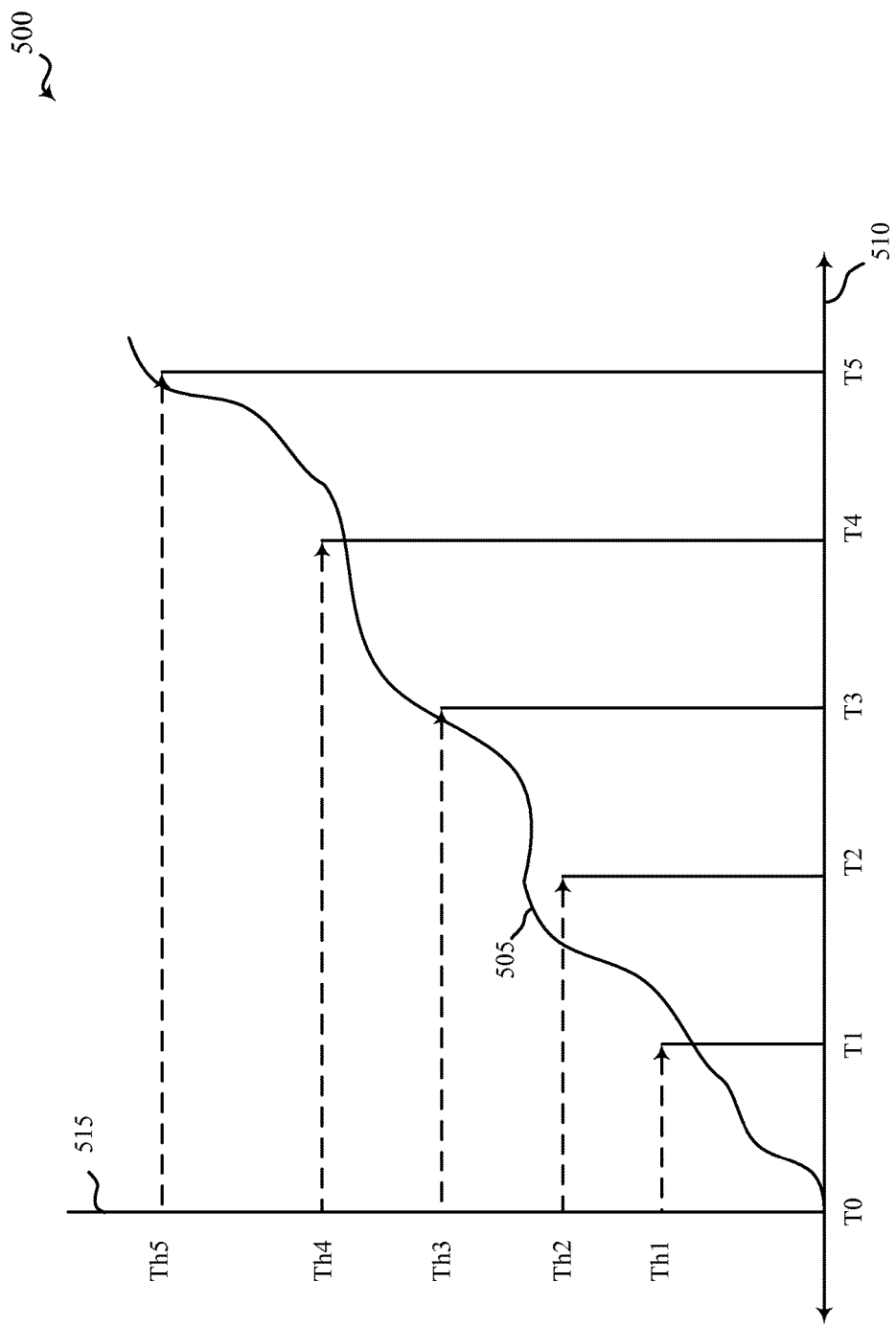
FIG. 5 shows an example timing chart diagram for congestion adapted active scan dwell time, in accordance with various aspects of the present disclosure.

FIG. 5 shows an example timing chart diagram 500 for congestion adapted active scan dwell time, in accordance with various aspects of the present disclosure. Aspects of the timing chart diagrams 500 may be implemented by one or more aspects of the ATs 110 described with reference to FIGS. 1-3.

Diagram 500 is a chart that shows one example of a channel congestion metric 505 plotted along a time axis 510 and a threshold value axis 515. At time T0, an AT 110 may transmit a probe request on a channel (e.g., a first channel) to initiate a scan procedure on the channel. The AT 110 may begin to accumulate the channel congestion metric 505 at time T0 by initiating one or more counters at time T0. In the example of diagram 500, the channel congestion metric 505 may be a cumulative value based on the output of the counter(s), e.g., a total value or raw count value of the one or more counters recording Wi-Fi transmissions.

In the example diagram 500, the AT 110 may use different threshold levels (e.g., Th1-Th5) to compare to the channel congestion metric 505 during different intervals. For example, threshold level Th1 may be used to evaluate the channel congestion metric 505 at time T1, threshold level Th2 may be used to evaluate the channel congestion metric 505 at time T2, and so on. The channel congestion metric 505 generally increases (e.g., the counter values continue to increment) once the probe request is sent at time T0, but may fluctuate around the respective threshold level over time. For example, the channel congestion metric 505 is below threshold Th1 at time T1, is above thresholds Th2 and Th3 at times T2 and T3, respectively, is below threshold Th4 at time T4, and above threshold Th5 at time T5.

The AT 110 may determine whether to exit the scan procedure on the first channel based on the channel congestion metric 505. For example, the AT 110 may compare the channel congestion metric 505 at each interval to its associated threshold level to determine whether to exit the channel. As described above, the AT 110 may identify a trend (or lack of a trend) to make the determination, may determine that the channel congestion metric 505 has satisfied (or not satisfied) the threshold level for a certain number of intervals, etc. The channel congestion metric 505 may provide an indication of the likelihood of receiving a probe response and the AT 110 may continue the scan procedure or exit the channel accordingly.

Figure 6:
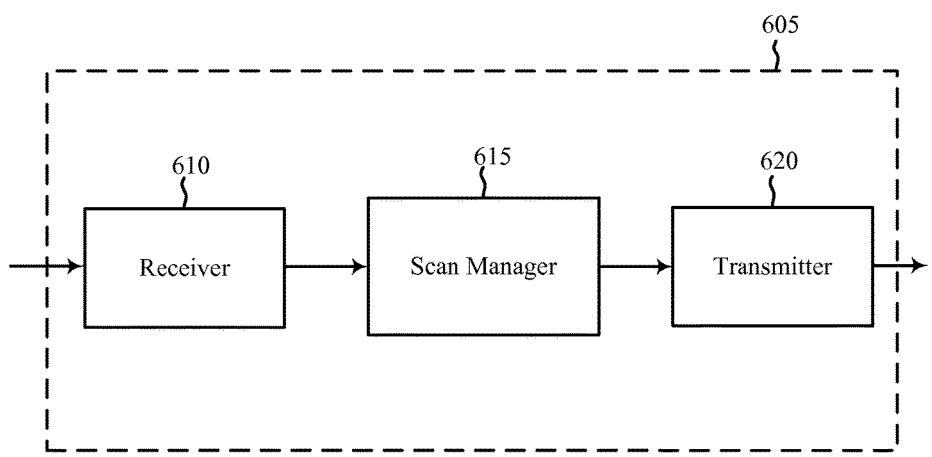
FIG. 6 shows a block diagram of a device configured for use in wireless communication, in accordance with various aspects of the present disclosure.

FIG. 6 shows a block diagram 600 of an apparatus 605 for use in an access terminal for wireless communication, in accordance with various aspects of the present disclosure. In some examples, the apparatus 605 may be an example of aspects of one or more of the ATs 110 described with reference to FIGS. 1-5. The apparatus 605 may also be or include a processor. The apparatus 605 may include a receiver 610, a scan manager 615, and/or a transmitter 620. Each of these components of the apparatus 605 may be in communication with each other. In some aspects, the apparatus 605 may be an AT configured to perform the described functions. In other aspects, the apparatus 605 may be a component of an AT (e.g., a chip or module of an AT) configured to perform the described functions.

The apparatus 605, through the receiver 610, the scan manager 615, and/or the transmitter 620, may be configured to perform the functions described herein. For example, the apparatus 605 may be configured for an adaptive dwell time for channel scanning that provides for a reduced total active scan time and conserves the power of the apparatus 605.

The components of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, field-programmable gate arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 610 may receive information such as packets, user data, and/or control information associated with various information channels (e.g., control channels, data channels, etc.). The receiver 610 may be configured to receive signals associated with a scan procedure on a channel, e.g., probe response(s), as well as other Wi-Fi traffic. Information may be passed on to the scan manager 615, and to other components of the apparatus 605.

The scan manager 615 may monitor, control, provide a means for, or otherwise manage one or more aspects of adaptive dwell time for channel scan procedures for the apparatus 605. For example, the scan manager 615 may identify the scan period associated with performing the scan procedure on a first channel. The scan manager 615 may analyze a channel congestion metric during the scan period and determine, based at least in part on the channel congestion metric, whether to exit the first channel, e.g., to end the scan procedure on the first channel. Accordingly, the scan manager 615 may provide a probe request for transmission on a second channel during a remaining portion of the scan period based on the determination to exit the first channel. The scan manager 615 may determine to end the dwell time on the first channel scan procedure and initiate a new scan procedure on a second channel by sending a probe request on the second channel. Accordingly, the scan manager 615 may adapt the dwell time for the scan procedure based on the Wi-Fi congestion on the channel indicating whether a probe response is expected. The scan manager 615 may perform the functions of a processing system for the apparatus 605.

The transmitter 620 may transmit the one or more signals received from other components of the apparatus 605. The transmitter 620 may transmit signals associated with a scan procedure, e.g., probe request message(s). In some examples, the transmitter 620 may be collocated with the receiver 610 in a transceiver. The transmitter 620 may include a single antenna, or it may include a plurality of antennas. In some aspects, the receiver 610 and/or the transmitter 620 may perform the functions of an interface for the apparatus 605.

Figure 7:
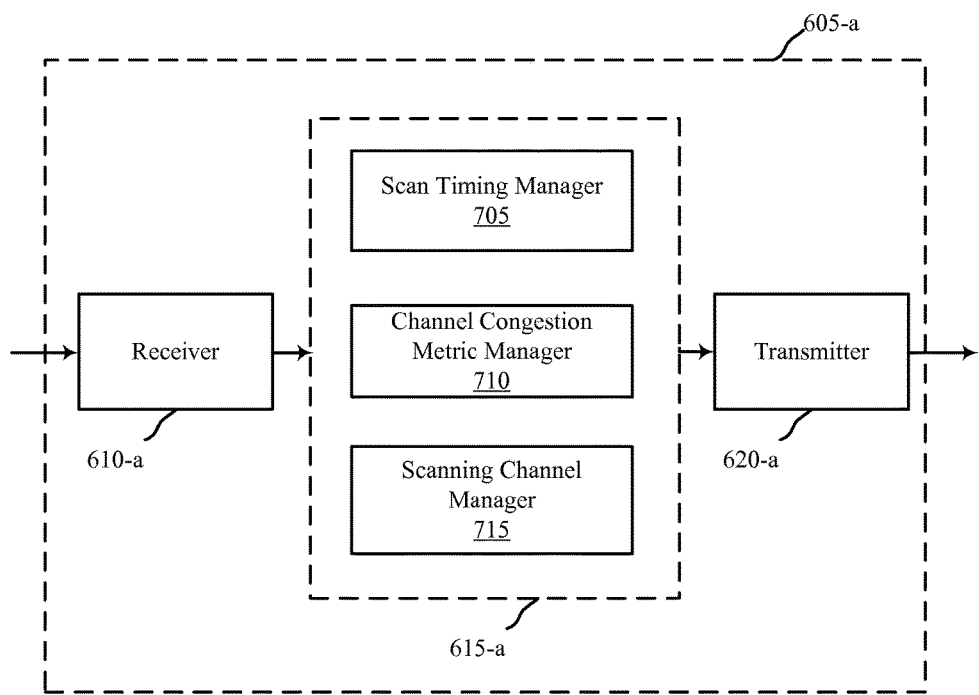
FIG. 7 shows a block diagram of a device configured for use in wireless communication, in accordance with various aspects of the present disclosure.

FIG. 7 shows a block diagram 700 of an apparatus 605-a that is used in a wireless station for wireless communication, in accordance with various examples. The apparatus 605-a may be an example of one or more aspects of an AT 110 described with reference to FIGS. 1-5. It may also be an example of an apparatus 605 described with reference to FIG. 6. The apparatus 605-a may include a receiver 610-a, a scan manager 615-a, and/or a transmitter 620-a, which may be examples of the corresponding components of apparatus 605. The apparatus 605-a may also include a processor. Each of these components may be in communication with each other. The scan manager 615-a may include a scan timing manager 705, a channel congestion metric manager 710, and a scanning channel manager 715. The receiver 610-a and the transmitter 620-a may perform the functions of the receiver 610 and the transmitter 620, of FIG. 6, respectively.

The apparatus 605-a may be an AT configured to perform the described functions. In other aspects, the apparatus 605-a may be a component of an AT (e.g., a chip or component of an AT) configured to perform the described functions. For example, the receiver 610-a and/or the transmitter 620-a may perform the functions of an interface for the apparatus 605-a. The scan manager 615-a, or one or more sub-components of the scan manager 615-a, may perform the functions of a processing system for the apparatus 605-a.

The scan timing manager 705 may monitor, control, provide a means for, or otherwise manage one or more timing aspects of a scan procedure for the apparatus 605-a. For example, the scan timing manager 705 may identify a scan period associated with performing a scan procedure on a first channel. The scan timing manager 705 may identify a plurality of intervals of the scan period. The plurality of intervals may provide more opportunities for channel congestion metric review, as is described below.

The channel congestion metric manager 710 may monitor, control, provide a means for, or otherwise manage one or more aspects of a channel congestion metric for the apparatus 605-a. For example, the channel congestion metric manager 710 may determine a channel congestion metric during intervals of the scan period of the scan procedure. The channel congestion metric manager 710 may analyze the channel congestion metric during the scan period and determine based, at least in part, on the channel congestion metric, whether to exit the first channel. The channel congestion metric may be based in part on a probability associated with receiving a probe response responsive to the transmission of a probe request. The channel congestion metric may be based on at least one of a Wi-Fi communications associated with the apparatus (e.g., the AT), a Wi-Fi uplink transmissions within a basic subscriber set (BSS) associated with the apparatus, a Wi-Fi downlink transmissions within the BSS associated with the apparatus, all Wi-Fi communications within the BSS associated with the apparatus, or a Wi-Fi communications for a BSS not associated with the apparatus The channel congestion metric manager 710 may analyze the channel congestion metric over a plurality of intervals of the scan period and determine whether to exit the first channel based on a function of the channel congestion metric over the plurality of intervals of the scan period. The channel congestion metric manager 710 may use different threshold levels of the channel congestion metric for each interval of the plurality of intervals, for example. The channel congestion metric manager 710 may identify a trend associated with the channel congestion metric over at least some of the plurality of intervals of the scan period. The determination of whether to exit the first channel may be based on the channel congestion metric trend.

The channel congestion metric manager 710 may determine whether a probe response is received during a first interval of the plurality of intervals of the scan period. The channel congestion metric manager 710 may transition to a second interval of the plurality of intervals of the scan period based at least in part on the reception of the probe response. The channel congestion metric manager 710 may exit the first channel based on the channel congestion metric satisfying a threshold level for a plurality of intervals of the scan period.

The channel congestion metric manager 710 may identify at least one threshold level that is associated with each interval of the plurality of intervals and analyze the channel congestion metric during each interval of the plurality of intervals. The channel congestion metric manager 710 may compare the channel congestion metric during each interval with the associated threshold level. The determination of whether to exit the first channel may be based on the comparison.

The scanning channel manager 715 may monitor, control, provide a means for, or otherwise manage one or more aspects of a scan procedure on a channel for the apparatus 605-a. For example, the scanning channel manager 715 may provide a probe request for transmission on the first channel to initiate the scan procedure on the first channel. The scanning channel manager 715 may also provide a probe request for transmission on a second channel during a remaining portion of the scan period based on the determination to exit the first channel.

Thus, the scan timing manager 705, the channel congestion metric manager 710, and the scanning channel manager 715 may, alone or in combination or in cooperation with other components (e.g., a processing system), provide a means for performing the aspects of the present disclosure. For example, the scan timing manager 705 may provide a means for identifying the scan period associated with performing the scan procedure on the first channel. The channel congestion metric manager 710 may provide a means for analyzing a channel congestion metric during the scan period and for determining whether to exit the first channel.

The scanning channel manager may provide a means for providing a probe request for transmission on a second channel.

Figure 8:
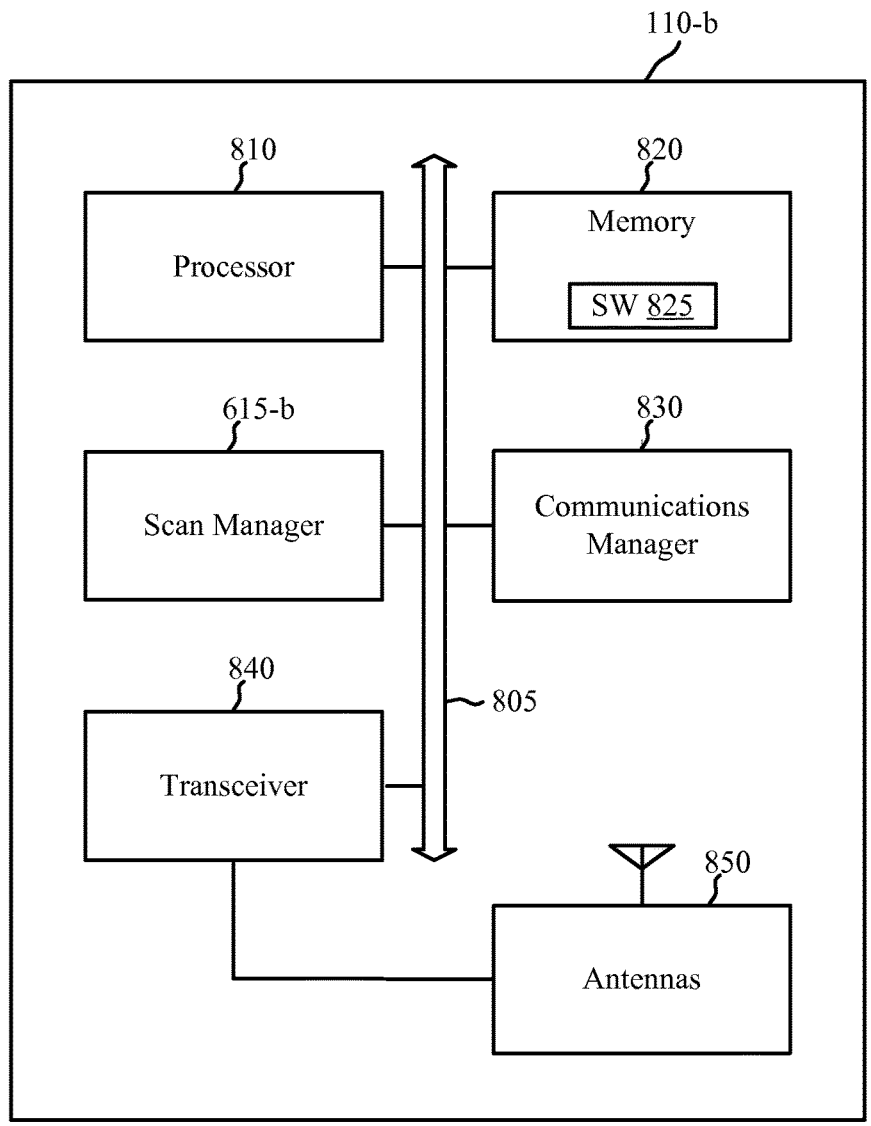
FIG. 8 shows a block diagram of an access terminal for use in wireless communication, in accordance with various aspects of the present disclosure.

Turning to FIG. 8, a block diagram 800 is shown that illustrates an AT 110-*b* configured for adaptive dwell time for channel scanning that provides for a reduced total active scan time and conserves power of the AT 110-*b*. The AT 110-*b* may have various other configurations and may be included or be part of a personal computer (e.g., laptop computer, netbook computer, tablet computer, etc.), a cellular telephone, a PDA, a digital video recorder (DVR), an internet appliance, a gaming console, an e-reader, etc. The AT 110-*b* may have an internal power supply, such as a small battery, to facilitate mobile operation. The AT 110-*b* may be an example of the ATs 110 described with reference to FIGS. 1-3, and the apparatus 605 described with reference to FIGS. 6-7.

The AT 110-*b* may include a processor 810, a memory 820, a transceiver 840, antennas 850, and a scan manager 615-*b*. The scan manager 615-*b* may be an example of the scan manager 615 of FIGS. 6 and 7. Each of these components may be in communication with each other, directly or indirectly, over at least one bus 805.

The memory 820 may include random access memory (RAM) and read-only memory (ROM). The memory 820 may store computer-readable, computer-executable software (SW) code 825 including instructions that are configured to, when executed, cause the processor 810 to perform various functions described herein for adaptive dwell time for scan operations. Alternatively, the software code 825 may not be directly executable by the processor 810 but be configured to cause the computer (e.g., when compiled and executed) to perform functions described herein.

The processor 810 may include an intelligent hardware device, e.g., a CPU, a microcontroller, an ASIC, etc. The processor 810 may process information received through the transceiver 840 and/or to be sent to the transceiver 840 for transmission through the antennas 850. The processor 810 may handle, alone or in connection with the scan manager 615-*b*, various aspects for adaptive dwell time for scan operations.

The transceiver 840 may be configured to communicate bi-directionally with APs 105 in FIGS. 1 and 2. The transceiver 840 may be implemented as at least one transmitter and at least one separate receiver. The transceiver 840 may include a modem configured to modulate the packets and provide the modulated packets to the antennas 850 for transmission, and to demodulate packets received from the antennas 850. While the AT 110-*b* may include a single antenna, there may be aspects in which the AT 110-*b* may include multiple antennas 850.

According to the architecture of FIG. 8, the AT 110-*b* may further include a communications manager 830. The communications manager 830 may manage communications with various APs or other ATs. The communications manager 830 may be a component of the AT 110-*b* in communication with some or all of the other components of the AT 110-*b* over at least one bus 805. Alternatively, functionality of the communications manager 830 may be implemented as a component of the transceiver 840, as a computer program product, and/or as at least one controller element of the processor 810.

The components of the AT 110-*b* may be configured to implement aspects discussed above with respect to FIGS. 1-7, and those aspects may not be repeated here for the sake of brevity. Moreover, the components of the AT 110-*b* may be configured to implement aspects discussed below with respect to FIGS. 9-11, and those aspects may also not be repeated here for the sake of brevity.

Figure 9:
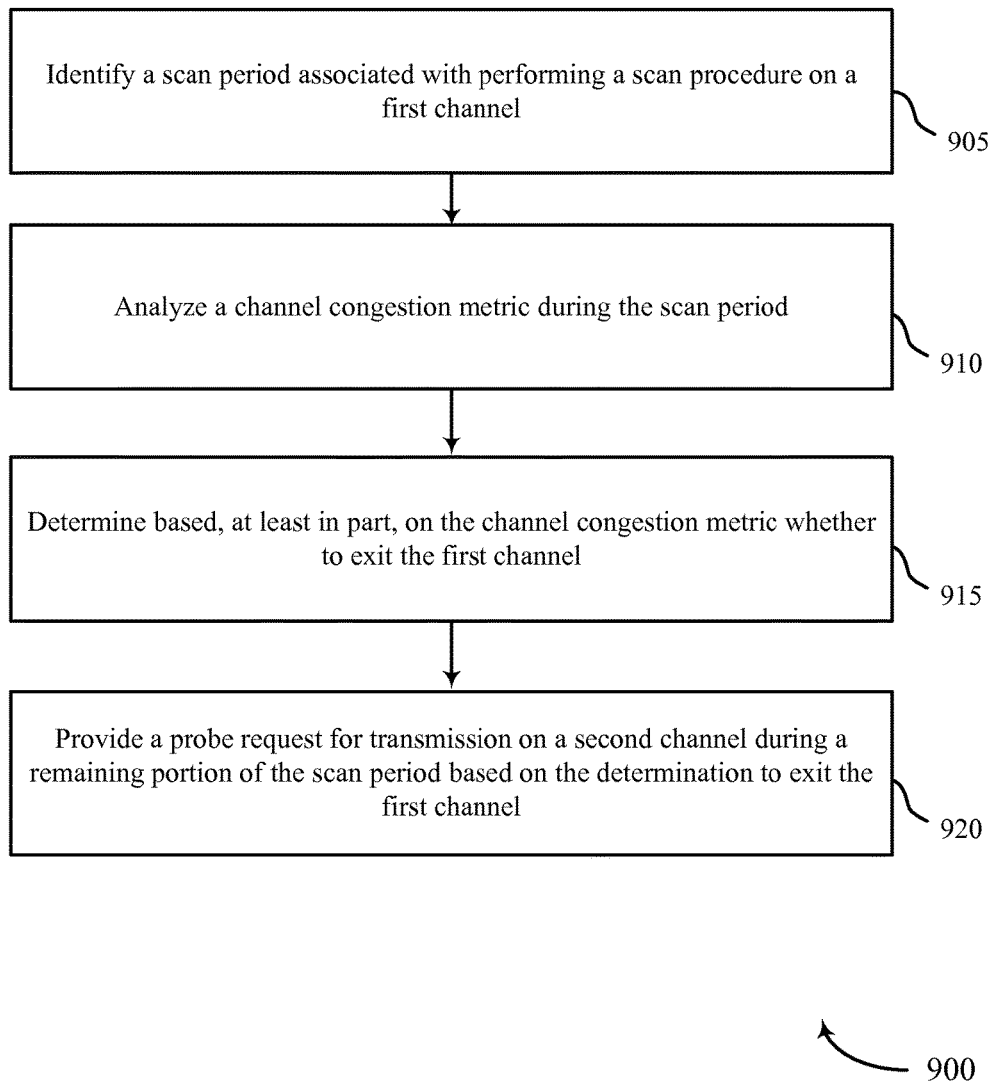
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the ATs 110 described with reference to FIGS. 1-3, and/or aspects of one or more of the apparatuses 605 described with reference to FIGS. 6-8. For example, the ATs 110 of FIGS. 1-3 and/or the apparatuses 605 of FIGS. 6-8 may be configured as a means for performing the functions described below. In some examples, an AT may execute one or more sets of codes to control the functional elements of the AT to perform the functions described below. Additionally, or alternatively, the AT may perform one or more of the functions described below using special-purpose hardware.

At block 905, the method 900 may include an AT identifying a scan period associated with a scan procedure on a first channel. At block 910, the method 900 may include the AT analyzing a channel congestion metric during the scan period. At block 915, the method 900 may include the AT determining based, at least in part, on the channel congestion metric whether to exit the first channel. At block 920, the method 900 may include the AT providing a probe request for transmission on a second channel during a remaining portion of the scan period based on the determination to exit the first channel.

The operation(s) at blocks 905, 910, 915, and/or 920 may be performed using the scan manager 615 described with reference to FIGS. 6-8.

Figure 10:
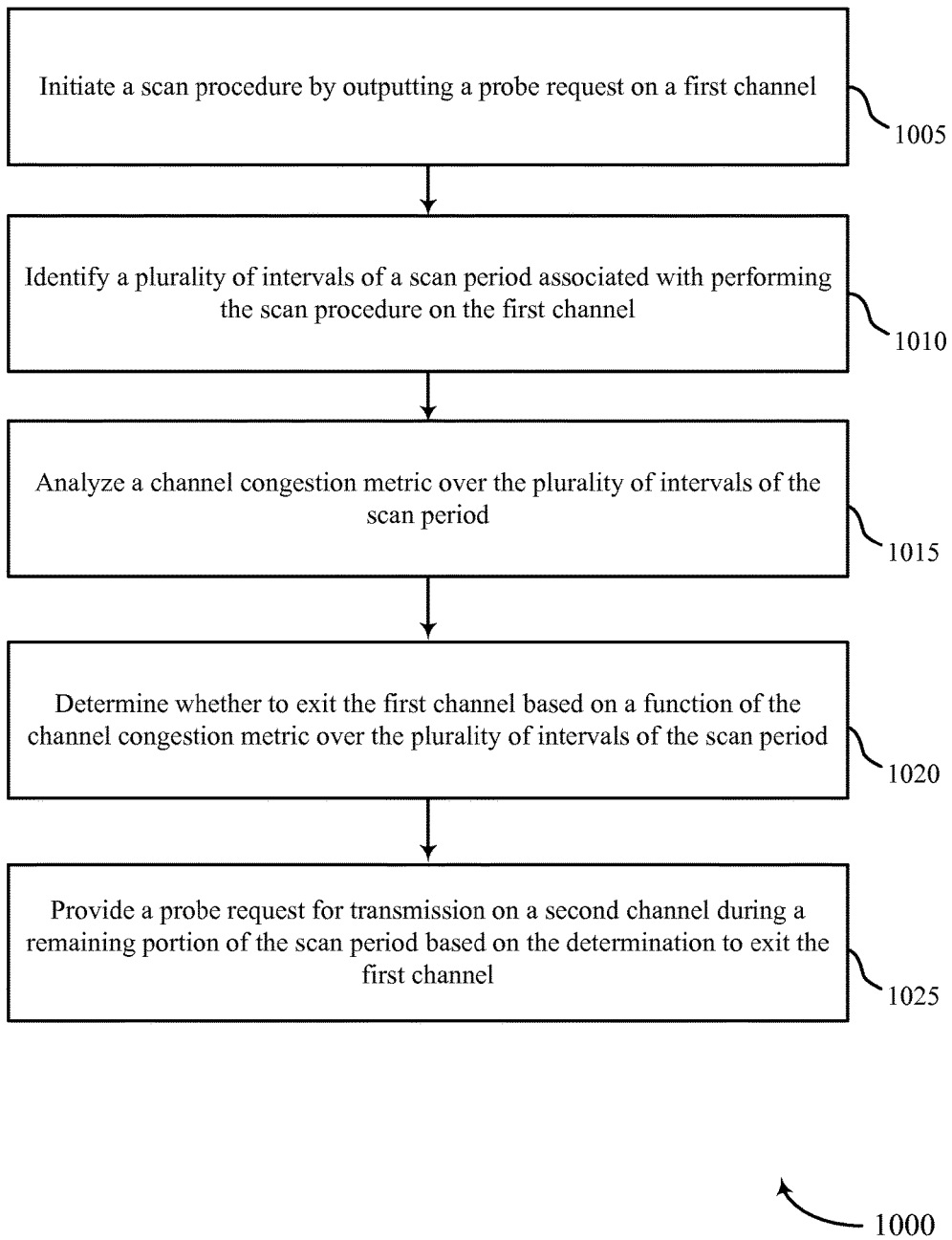
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the ATs 110 described with reference to FIGS. 1-3, and/or aspects of one or more of the apparatuses 605 described with reference to FIGS. 6-8. For example, the ATs 110 of FIGS. 1-3 and/or the apparatuses 605 of FIGS. 6-8 may be configured as a means for performing the functions described below. In some examples, an AT may execute one or more sets of codes to control the functional elements of the AT to perform the functions described below. Additionally or alternatively, the AT may perform one or more of the functions described below using special-purpose hardware.

At block 1005, the method 1000 may include an AT initiating a scan procedure on a first channel by providing a probe request for transmission on the first channel. At block 1010, the method 1000 may include the AT identifying a plurality of intervals of a scan period associated with the scan procedure on the first channel. At block 1015, the method 1000 may include the AT analyzing a channel congestion metric over the plurality of intervals of the scan period. At block 1020, the method 1000 may include the AT determining whether to exit the first channel based on a function of the channel congestion metric over the plurality of intervals of the scan period. At block 1025, the method 1000 may include the AT providing a probe request for transmission on a second channel during a remaining portion of the scan period based on the determination to exit the first channel.

The operation(s) at blocks 1005, 1010, 1015, 1020, and/or 1025 may be performed using the scan manager 615 described with reference to FIGS. 6-8.

Figure 11:
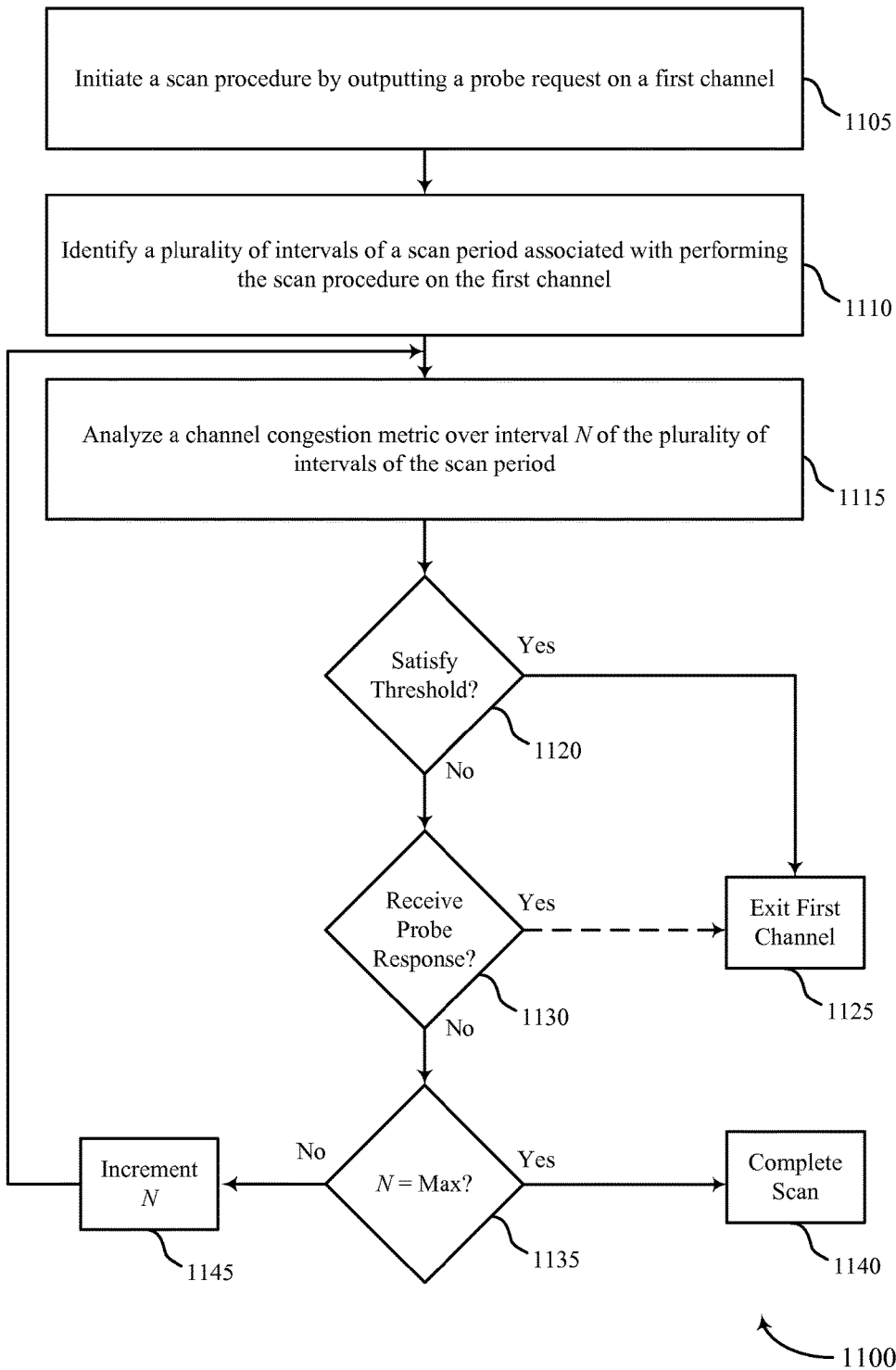
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the ATs 110 described with reference to FIGS. 1-3, and/or aspects of one or more of the apparatuses 605 described with reference to FIGS. 6-8. For example, the ATs 110 of FIGS. 1-3 and/or the apparatuses 605 of FIGS. 6-8 may be configured as a means for performing the functions described below. In some examples, an AT may execute one or more sets of codes to control the functional elements of the AT to perform the functions described below. Additionally or alternatively, the AT may perform one or more of the functions described below using special-purpose hardware.

At block 1105, the method 1100 may include an AT initiating a scan procedure on a first channel by providing a probe request for transmission on the first channel. At block 1110, the method 1100 may include the AT identifying a plurality of intervals of a scan period associated with the scan procedure on the first channel. At block 1115, the method 1100 may include the AT analyzing a channel congestion metric over N of the plurality of intervals of the scan period. At block 1120, the method 1100 may include the AT determining whether the channel congestion metric satisfies a threshold. If the channel congestion metric satisfies the threshold, the method 1100 may move to block 1125 where the AT exits the first channel. If the channel congestion metric does not satisfy the threshold, the method 1100 moves to block 1130 where the AT determines whether a probe response was received during the interval. If a probe response was received, the method 1100 optionally moves to block 1125 and again exits the first channel. For example, receiving a probe response may, in some configurations result in exiting the first channel (e.g., when awaiting reception of a probe response from a specific access point). In other configurations, reception of a probe response may not result in exiting the first channel (e.g., when awaiting reception of probe responses from all access points on the first channel) and, instead, the method may move to block 1135. If a probe response was not received, the method 1100 moves to block 1135 where the AT determines if N has reached a maximum N value. If N has reached a maximum value, the method 1100 may move to block 1140 where the scan on the first channel is complete (and the AT may exit the first channel and optionally move to a scan procedure on a second channel). If N has not reached a maximum value, the method moves to block 1145 where N is incremented and returns to block 1115 where the channel congestion metric over the next interval is analyzed.

The operation(s) at blocks 1105, 1110, 1115, 1120, 1125, 1130, 1135, 1140, and/or 1145 may be performed using the scan manager 615 described with reference to FIGS. 6-8.

Thus, the methods 900-1100 may provide for wireless communication. It should be noted that the methods 900-1100 are just one implementation and that the operations of the methods may be rearranged or otherwise modified such that other implementations are possible. In some examples, aspects from two or more of the methods 900-1100 may be combined.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

Means for identifying may include a processing system, which may include one or more processors, such as the processor 810, and/or the scan manager 615 of the apparatus 605 and/or the wireless station 110 illustrated in FIGS. 6-8. Means for identifying may further include the scan timing manager 705 illustrated in FIG. 7.

Means for analyzing may include a processing system, which may include one or more processors, such as the processor 810, and/or the scan manager 615 of the apparatus 605 and/or the wireless station 110 illustrated in FIGS. 6-8. Means for analyzing may further include the channel congestion manager 710 illustrated in FIG. 7.

Means for determining may include a processing system, which may include one or more processors, such as the processor 810, and/or the scan manager 615 of the apparatus 605 and/or the wireless station 110 illustrated in FIGS. 6-8. Means for determining may further include the channel congestion manager 710 illustrated in FIG. 7.

Means for providing (e.g., transmitting or outputting for transmission) may include a processing system, which may include one or more processors, such as the processor 810, and/or the scan manager 615 of the apparatus 605 and/or the wireless station 110 illustrated in FIGS. 6-8. Means for providing may further include the scanning channel manager 715 illustrated in FIG. 7. In some examples, means for providing may further include the transmitter 620 illustrated in FIGS. 6 and 7, the communications manager 830, the transceiver 840, and/or the antennas 850 illustrated in FIG. 8.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. The computer-program product may comprise packaging materials to advertise the computer-readable medium therein for purchase by consumers.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AA or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read-only memory (EEPROM), flash memory, compact disc, read-only memory (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. An apparatus for wireless communication, comprising:
   a processing system configured to:
      identify a scan period associated with performing a scan procedure on a first channel;
      analyze a channel congestion metric during the scan period;
      determine based, at least in part, on the channel congestion metric whether to exit the first channel; and
   a first interface configured to provide a probe request for transmission on a second channel during a remaining portion of the scan period based on the determination to exit the first channel.

2. The apparatus of claim 1, wherein the processing system is further configured to:
   analyze the channel congestion metric over a plurality of intervals of the scan period; and
   determine whether to exit the first channel based on a function of the channel congestion metric over the plurality of intervals of the scan period.

3. The apparatus of claim 2, wherein the function of the channel congestion metric comprises a different threshold level of the channel congestion metric for each interval of the plurality of intervals.

4. The apparatus of claim 1, wherein the processing system is further configured to:
   identify a trend associated with the channel congestion metric over at least some of a plurality of intervals of the scan period; and
   wherein the determination whether to exit the first channel is further based on the trend associated with the channel congestion metric.

5. The apparatus of claim 1, wherein the processing system is further configured to determine whether a probe response is received during a first interval of a plurality of intervals of the scan period; and
   wherein the processing system is further configured to transition to a second interval of the plurality of intervals of the scan period based at least in part on reception of the probe response.

6. The apparatus of claim 1, wherein the processing system is further configured to:
   exit the first channel based on the channel congestion metric satisfying a threshold level for a plurality of intervals of the scan period.

7. The apparatus of claim 1, wherein the processing system is further configured to:
   divide at least one threshold level that is associated with each interval of the plurality of intervals;
   analyze the channel congestion metric during each interval of the plurality of intervals; and
   compare the channel congestion metric during each interval with the associated threshold level, wherein the determination whether to exit the first channel is further based on the comparison.

8. The apparatus of claim 1, the first interface is further configured to initiate the scan procedure by outputting an initial probe request for transmission.

9. The apparatus of claim 1, wherein the channel congestion metric is based in part on a probability associated with receiving a probe response responsive to the transmission of the probe request.

10. The apparatus of claim 1, wherein the channel congestion metric is based on at least one of a Wi-Fi communication associated with the apparatus, a one or more Wi-Fi communications within a basic subscriber set (BSS) associated with the apparatus, or a Wi-Fi communication for a BSS not associated with the apparatus.

11. A method for wireless communication, comprising:
   identifying a scan period associated with performing a scan procedure on a first channel;
   analyzing a channel congestion metric during the scan period;
   determining based, at least in part, on the channel congestion metric whether to exit the first channel; and
   providing a probe request for transmission on a second channel during a remaining portion of the scan period based on the determination to exit the first channel.

12. The method of claim 11, further comprising:
   analyzing the channel congestion metric over a plurality of intervals of the scan period; and
   determining whether to exit the first channel based on a function of the channel congestion metric over the plurality of intervals of the scan period.

13. The method of claim 12, wherein the function of the channel congestion metric comprises a different threshold level of the channel congestion metric for each interval of the plurality of intervals.

14. The method of claim 11, further comprising:
   identifying a trend associated with the channel congestion metric over at least some of a plurality of intervals of the scan period, wherein the determination whether to exit the first channel is further based on the trend associated with the channel congestion metric.

15. The method of claim 11, further comprising;
   determining whether a probe response is received during a first interval of a plurality of intervals of the scan period; and
   transitioning to a second interval of the plurality of intervals of the scan period based at least in part on reception of the probe response.

16. The method of claim 11, further comprising:
   exiting the first channel based on the channel congestion metric satisfying a threshold level for a plurality of intervals of the scan period.

17. The method of claim 11, further comprising:
   dividing the scan period into a plurality of intervals;
   identifying at least one threshold level that is associated with each interval of the plurality of intervals;
   analyzing the channel congestion metric during each interval of the plurality of intervals; and
   comparing the channel congestion metric during each interval with the associated threshold level, wherein the determination whether to exit the first channel is further based on the comparison.

18. The method of claim 11, further comprising:
   initiating the can procedure by outputting an initial probe request for transmission.

19. The method of claim 11, wherein the channel congestion metric is based in part on a probability associated with receiving a probe response responsive to the transmission of the probe request.

20. The method of claim 11, wherein the channel congestion metric is based on at least one of a Wi-Fi communication associated with the apparatus, one or more Wi-Fi communications within a basic subscriber set (BSS) associated with the apparatus, or a Wi-Fi communication for a BSS not associated with the apparatus.

21. An apparatus for wireless communication, comprising:
   means for identifying a scan period associated with performing a scan procedure on a first channel;
   means for identifying a scan period associated with performing a scan procedure on a first channel; means for analyzing a channel congestion metric during the scan period;
   means for determining based, at least in part, on the channel congestion metric whether to exit the first channel; and
   means for providing a probe request for transmission on a second channel during a remaining portion of the scan period based on the determination to exit the first channel.

22. The apparatus of claim 21, further comprising:
   means for analyzing the channel congestion metric over a plurality of intervals of the scan period; and
   means for determining whether to exit the first channel based on a function of the channel congestion metric over the plurality of intervals of the scan period.

23. The apparatus of claim 22, wherein the function of the channel congestion metric comprises a different threshold level of the channel congestion metric for each interval of the plurality of intervals.

24. The apparatus of claim 21, further comprising:
   means for identifying a trend associated with the channel congestion metric over at least some of a plurality of intervals of the scan period, wherein the determination whether to exit the first channel is further based on the trend associated with the channel congestion metric.

25. The apparatus of claim 21, further comprising:
   means for determining whether a probe response is received during a first interval of a plurality of intervals of the scan period; and
   means for transitioning to a second interval of the plurality of intervals of the scan period based at least in part on reception of the probe response.

26. The apparatus of claim 21, further comprising:
   means for exiting the first channel based on the channel congestion metric satisfying a threshold level for a plurality of intervals of the scan period.

27. The apparatus of claim 21, further comprising:
   means for dividing the scan period into a plurality of intervals;
   means for identifying at least one threshold level that is associated with each interval of the plurality of intervals;
   means for analyzing the channel congestion metric during each interval of the plurality of intervals; and
   means for comparing the channel congestion metric during each interval with the associated threshold level, wherein the determination whether to exit the first channel is further based on the comparison.

28. The apparatus of claim 21, further comprising:
   means for initiating the scan procedure by outputting an initial probe request for transmission.

29. The apparatus of claim 21, wherein the channel congestion metric is based in part on a probability associated with receiving a probe response responsive to the transmission of the probe request.

30. An access terminal for wireless communication, comprising:
   a processing system configured to:
      identify a scan period associated with performing a scan procedure on a first channel;
      analyze a channel congestion metric during the scan period;
      determine based, at least in part, on the channel congestion metric whether to exit the first channel; and a transmitter configured to transmit a probe request for transmission on a second channel during a remaining portion of the scan period based on the determination to exit the first channel.

\* \* \* \* \*